United States Patent
Mittal et al.

(10) Patent No.: US 11,115,846 B2
(45) Date of Patent: Sep. 7, 2021

(54) METHOD AND APPARATUS FOR GENERATING A CHANNEL STATE INFORMATION REPORT USING AN OVERSAMPLING FACTOR FOR A SUBSET OF THE SET OF BEAMS

(71) Applicant: Lenovo (Singapore) Pte. Ltd., New Tech Park (SG)

(72) Inventors: Udar Mittal, Rolling Meadows, IL (US); Tyler Brown, Lake Zurich, IL (US); Ahmed Hindy, Forest Park, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 16/840,306

(22) Filed: Apr. 3, 2020

(65) Prior Publication Data
US 2020/0322823 A1 Oct. 8, 2020

Related U.S. Application Data

(60) Provisional application No. 62/830,201, filed on Apr. 5, 2019.

(51) Int. Cl.
*H04B 7/02* (2018.01)
*H04W 24/08* (2009.01)
(Continued)

(52) U.S. Cl.
CPC .......... *H04W 24/08* (2013.01); *H04B 7/0452* (2013.01); *H04B 7/0456* (2013.01); *H04B 7/0626* (2013.01); *H04L 5/0048* (2013.01)

(58) Field of Classification Search
CPC .. H04B 7/0626; H04B 7/0639; H04B 7/0634; H04B 7/0417; H04B 7/0456;
(Continued)

(56) References Cited

U.S. PATENT DOCUMENTS

| 10,742,272 | B2* | 8/2020 | Wu ...................... H04B 7/0634 |
| 2016/0156397 | A1* | 6/2016 | Onggosanusi .......... H04L 5/005 370/252 |

(Continued)

OTHER PUBLICATIONS

Motorola Mobility, "Type II CSI overhead reduction", R1-1813357, for 3GPP TSG RAN1 #95, Spokane, China, Nov. 12-16, 2018.
(Continued)

*Primary Examiner* — Khai Tran
(74) *Attorney, Agent, or Firm* — Loppnow & Chapa

(57) ABSTRACT

A method and apparatus are provided for generating a channel state information report. A set of reference signals transmitted from a base station are received, and a set of beams are identified based on the set of reference signals. The set of reference signals is transformed to obtain a set of vectors of amplitude and phase coefficients of a compressed codebook, each amplitude coefficient vector and phase coefficient vector corresponding to an identified beam in the set of beams. The amplitude coefficient vector for each identified beam in the set of beams is adjusted by a selected value, wherein the selected value is determined such that the amplitude coefficient vector corresponding to a particular beam is normalized to a known predetermined value. A predefined oversampling factor is set to a subset of the set of beams to a value greater than one, wherein the particular beam is excluded from the subset of beams. A fractional part of the predefined oversampling factor of the subset of beams is generated, wherein the fractional part is based on the value of the predefined oversampling factor of the subset of beams. An indication of the fractional part of the predefined oversampling factor is reported as a part of the channel state information report.

20 Claims, 5 Drawing Sheets

(51) Int. Cl.
*H04B 7/0452* (2017.01)
*H04B 7/0456* (2017.01)
*H04B 7/06* (2006.01)
*H04L 5/00* (2006.01)

(58) Field of Classification Search
CPC .. H04B 7/0617; H04B 7/0421; H04B 7/0478; H04W 24/02; H04W 4/029; H04W 64/00; H04W 48/06; G01S 5/0221
USPC .......................................... 375/267, 260, 252
See application file for complete search history.

(56) References Cited

U.S. PATENT DOCUMENTS

| | | | |
|---|---|---|---|
| 2017/0048863 A1 | 2/2017 | Tsai et al. | |
| 2018/0254813 A1 | 9/2018 | Gao et al. | |
| 2018/0279293 A1 | 9/2018 | Harrison et al. | |
| 2020/0295813 A1* | 9/2020 | Rahman | H04B 7/0478 |
| 2020/0313744 A1* | 10/2020 | Hindy | H04B 7/0478 |

OTHER PUBLICATIONS

Samsung, "Summary of Tuesday Offline Session on MU-MIMO CSI Enhancement", R1-1901396, for 3GPP TSG RAN WG1 Ad-Hoc Meeting 1901, Taipei, Taiwan, Jan. 21-25, 2019.
Ericsson, "On the necessity of feeding back oversampling index for Type II CSI enhancements", R1-1905115, for 3GPP TSG RAN WG1 Meeting Ran1#96-bis, Xi'an, China, Apr. 8-12, 2019.
PCT International Search Report for PCT/IB2020/053240, Lenovo (Singapore) Pte. Ltd., dated May 15, 2020.
Huawei et al., "Discussion on CSI enhancement", R1-1903969, for 3GPP TSG RAN WG1 #96bis, Xi'an, China, Apr. 8-12, 2019.

* cited by examiner

| EDGE O3=1, BOTH POLARIZATIONS | EDGE, O3=1, MAIN POLARIZATION, O3=4 OTHER POLARIZATION | UPT O3=1, BOTH POLARIZATIONS | UPT, O3=1, MAIN POLARIZATION, O3=4 OTHER POLARIZATION |
|---|---|---|---|
| 7.17 | 7.21 | 23.06 | 23.15 |
| 7.01 | 7.03 | 22.18 | 22.28 |
| 7.33 | 7.36 | 23.36 | 23.44 |
| 7.19 | 7.21 | 22.48 | 22.56 |
| 6.88 | 6.93 | 22.70 | 22.77 |
| 7.08 | 7.13 | 22.31 | 22.38 |
| 6.69 | 6.66 | 22.22 | 22.27 |
| 7.19 | 7.17 | 22.59 | 22.66 |
| 7.41 | 7.45 | 22.88 | 22.95 |
| 7.21 | 7.23 | 23.05 | 23.14 |
| 7.1 | 7.10 | 21.83 | 21.91 |
| 6.92 | 6.99 | 21.83 | 21.90 |
| 7.06 | 7.07 | 22.62 | 22.71 |
| 7.23 | 7.27 | 22.75 | 22.81 |
| 7.19 | 7.22 | 22.50 | 22.55 |
| 7.75 | 7.77 | 23.32 | 23.42 |
| 6.87 | 7.16 | 22.64 | 22.89 |
| 7.12 | 7.10 | 23.00 | 23.09 |
| 7.38 | 7.39 | 23.08 | 23.18 |
| 7.86 | 7.86 | 23.57 | 23.63 |
| MEAN VALUES | | | |
| 7.18 | 7.21 | 22.70 | 22.78 |

FIG. 2

US 11,115,846 B2

METHOD AND APPARATUS FOR GENERATING A CHANNEL STATE INFORMATION REPORT USING AN OVERSAMPLING FACTOR FOR A SUBSET OF THE SET OF BEAMS

FIELD OF THE INVENTION

The present disclosure is directed to a method and apparatus for generating a channel state information report using an oversampling factor for a subset of the set of beams. In some instances, such a report can involve a type-2 codebook compression using an oversampling factor.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

In an effort to enhance system performance, more recent standards have looked at different forms of spatial diversity including different forms of multiple input multiple output (MIMO) systems, which involve the use of multiple antennas at each of the source and the destination of the wireless communication for multiplying the capacity of the radio link through the use of multipath propagation. Such a system makes increasingly possible the simultaneous transmission and reception of more than one data signal using the same radio channel.

As part of supporting MIMO communications, user equipment can make use of channel state information codebooks, which help to define the nature of the adopted beams, which are used to support a particular data connection. Higher rank codebooks can sometimes be used to enhance system performance, but often at the price of an increase in the amount of feedback overhead.

In at least some wireless communication systems, channel state information (CSI) feedback is used to report on current channel conditions. This can be increasingly useful in frequency division duplexing (FDD) and frequency division multiple access (FDMA) systems where the downlink (DL) and uplink (UL) channels are not reciprocal. With multi-user (MU)-MIMO and spatial multiplexing, a receiving device, such as a user equipment (UE), may need to report channel conditions for multiple channels or beams. Accordingly, a meaningful amount of overhead may be dedicated to CSI reporting in MU-MIMO and spatial multiplexing systems.

The present inventors have recognized that improved methods for efficiently coding a channel state information report may be beneficial, as well as apparatuses and systems that perform the functions of the methods. The present inventors have further recognized that one such method can include communicating with a network using spatial multiplexing, which includes one or more base stations. Here, associating a potentially different oversampling factor value for each of the multiple subsets of a set of beams, may be beneficial. An indication of the various oversampling values for at least some of the subsets may then be communicated as part of a channel state information report.

SUMMARY

The present application provides a method in a user equipment for generating a channel state information report. The method includes receiving a set of reference signals transmitted from a base station, and identifying a set of beams based on the set of reference signals. The set of reference signals is transformed to obtain a set of vectors of amplitude and phase coefficients of a compressed codebook, each amplitude coefficient vector and phase coefficient vector corresponding to an identified beam in the set of beams. The amplitude coefficient vector for each identified beam in the set of beams is adjusted by a selected value, wherein the selected value is determined such that the amplitude coefficient vector corresponding to a particular beam is normalized to a known predetermined value. A predefined oversampling factor is set to a subset of the set of beams to a value greater than one, wherein the particular beam is excluded from the subset of beams. A fractional part of the predefined oversampling factor of the subset of beams is generated, wherein the fractional part is based on the value of the predefined oversampling factor of the subset of beams. An indication of the fractional part of the predefined oversampling factor is reported as a part of the channel state information report.

According to another possible embodiment, a user equipment for generating a channel state information report is provided. The user equipment includes a transceiver that receives a set of reference signals transmitted from a base station. The user equipment further includes a controller that identifies a set of beams based on the set of reference signals. The controller transforms the set of reference signals to obtain a set of vectors of amplitude and phase coefficients of a compressed codebook, each amplitude coefficient vector and phase coefficient vector corresponding to an identified beam in the set of beams. The amplitude coefficient vector for each identified beam in the set of beams is adjusted by the controller by a selected value, wherein the selected value is determined such that the amplitude coefficient vector corresponding to a particular beam is normalized to a known predetermined value. The controller sets a predefined oversampling factor to a subset of the set of beams to a value greater than one, wherein the particular beam is excluded from the subset of beams. The controller generates a fractional part of the predefined oversampling factor of the subset of beams wherein the fractional part is based on the value of the predefined oversampling factor of the subset of beams. The transceiver reports an indication of the fractional part of the predefined oversampling factor as a part of the channel state information report.

According to a further possible embodiment, a method in a network including at least one base station for generating a channel state information report corresponding to a particular user equipment is provided. The method includes transmitting a set of reference signals transmitted from a base station, and receiving an indication of a fractional part of a predefined oversampling factor as a part of the channel state information report. A set of beams are identified based on the set of reference signals. The set of reference signals are transformed to obtain a set of vectors of amplitude and phase coefficients of a compressed codebook, each amplitude coefficient vector and phase coefficient vector corresponding to an identified beam in the set of beams. The amplitude coefficient vector for each identified beam in the set of beams are adjusted by a selected value, where the selected value is determined such that the amplitude coefficient vector corresponding to a particular beam is normalized to a known predetermined value. The predefined oversampling factor are set to a subset of the set of beams to a value greater than one, where the particular beam was excluded from the subset of beams. The fractional part of the predefined oversampling factor of the subset of beams are generated, the fractional part being based on the value of the predefined oversampling factor of the subset of beams.

According to a still further possible embodiment, a network including at least one base station for generating a channel state information report corresponding to a particular user equipment is provided. The network includes a controller, and a transceiver that transmitting a set of reference signals transmitted from a base station, and receives an indication of a fractional part of a predefined oversampling factor as a part of the channel state information report. A set of beams are identified based on the set of reference signals. The set of reference signals are transformed to obtain a set of vectors of amplitude and phase coefficients of a compressed codebook, each amplitude coefficient vector and phase coefficient vector corresponding to an identified beam in the set of beams. The amplitude coefficient vector for each identified beam in the set of beams are adjusted by a selected value, where the selected value is determined such that the amplitude coefficient vector corresponding to a particular beam is normalized to a known predetermined value. The predefined oversampling factor are set to a subset of the set of beams to a value greater than one, where the particular beam was excluded from the subset of beams. The fractional part of the predefined oversampling factor of the subset of beams are generated, the fractional part being based on the value of the predefined oversampling factor of the subset of beams.

These and other features, and advantages of the present application are evident from the following description of one or more preferred embodiments, with reference to the accompanying drawings.

BRIEF DESCRIPTION OF THE DRAWINGS

FIG. 2 is a table showing an exemplary gain from using an oversampling value equal to four over at least one polarization corresponding to one of a subset of beams;

DETAILED DESCRIPTION OF THE PREFERRED EMBODIMENT(S)

Figure 1:
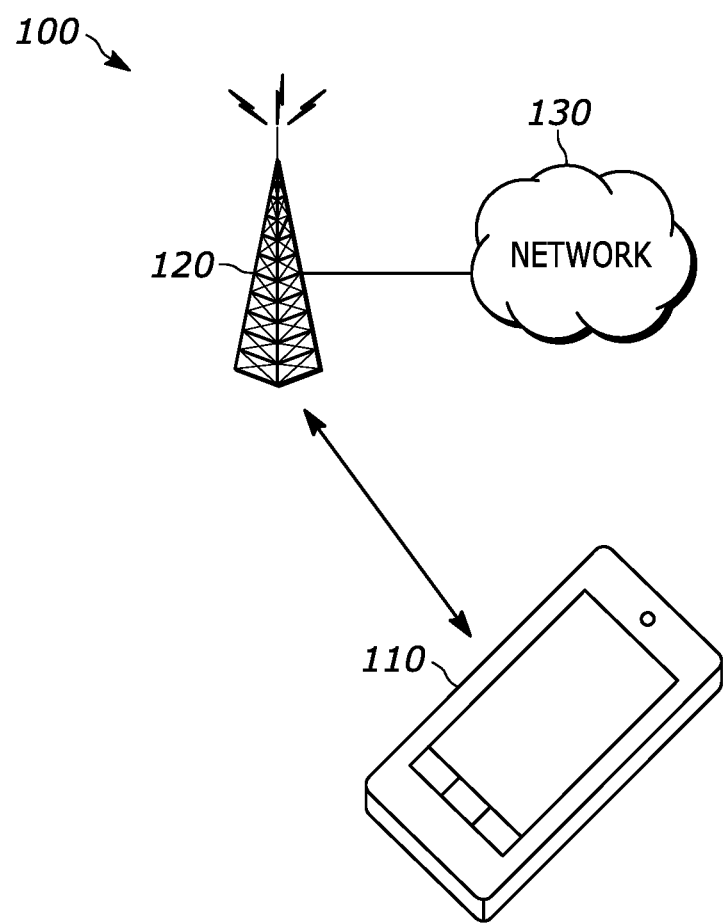
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for generating a channel state information report. In some instances, such a report can involve a type-2 codebook compression using an oversampling factor.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

The oversampling of a time domain signal may help in localization of the energy in small number of taps and thereby help in quantization. However, with precoding vectors, where precoding vector(s) are generated as a summation of spatial basis vectors (beams), having a common oversampling over all the beams may not provide any performance gain. However, oversampling is possible in other vectors. Independently oversampling all the other vectors may results in using too many bits which may not be justifiable.

The singular vectors of a matrix are typically not unique in the sense that they are insensitive to scaling by a unit magnitude complex number. Thus, the phase of a singular vector is implementation dependent, which in some instances can be said to be random.

In Type-2 channel state information (CSI) compression, many of these singular vectors are stacked together before a transformation is applied to it. Having a random phase results in failure of the transformation based compression methods. In addition the phase ambiguity of the singular vectors can cause wasted overhead when coefficients of the singular vectors are reported randomly such as with Type-2 codebook compression.

The Discrete Fourier Transform (DFT) transformation applied on generating the precoding vectors is said to transform the precoding vectors from the frequency domain to time domain or tap domain. Oversampling of a time domain signal can help in localization of the energy in small number of taps and thereby helps in quantization. However, in Type-2 precoding vectors, where the precoding vectors are generated as a summation of spatial basis vectors (beams), having a common oversampling over all the beams does not typically provide any performance gain. Independent oversampling of different beams may provide some performance gain. Nevertheless, independently oversampling each of the beams may result in using too many overhead bits to economically report the oversampling factor for each beam, which may not be justifiable. In some embodiments, beams may be just a reference signal or one-to-one mapping with a reference signal instead of being DFT beams.

At least some aspects of the present application attempt to provide a suitable oversampling approach to a subset of the remaining beams to improve transform based Type-2 codebook compression.

In at least some discussions, a Type-2 precoding compression scheme has been described based on transforming each beams frequency-domain precoding vectors to the time domain and selecting a subset of the time-domain components which would then be fed back to the gNB. The gNB would then perform the inverse transformation to the frequency domain to determine the set of 2L precoding vectors or beams. If, as in at least some conventional Type II feedback, the beam selection matrix is denoted $$W_1 = \begin{bmatrix} B & 0 \\ 0 & B \end{bmatrix}$$

then the resulting $2N_1N_2 \times N_{sb}$ precoding matrix for a layer can be expressed $$W = W_1 \tilde{W}'_2 V, \quad (1)$$

where V is a square matrix of size $O3 \cdot N_{sb} \times O3 \cdot N_{sb}$ representing oversampled DFT matrix, where O3 is an oversampling factor, and $\tilde{W}_2 = [\hat{w}_{2,1} \hat{w}_{2,2} \ldots \hat{w}_{2,2L}]$ is comprised of 2L time-domain coefficient vectors of length $O3 \cdot N_{sb}$, and $W'_2 = \tilde{W}'_2 V$. W is a set of $2N_1N_2 \times 1$ dimensional precoding vectors (each row is a precoding vector), one each for each of the $N_{sb}$ sub-bands. Operation in (1) will generate O3 $N_{sb}$ vectors. However, many of them will be discarded depending on the value of the oversampling factor. O3 is typically chosen as having a value of four. The following steps are typically performed for generation of $\tilde{W}_2$:

1. Using the estimate of the channel matrix ($H_{sb}$) for each of the $N_{sb}$ sub-bands, and the already computed $W_1$, compute $W_2$. This step can involve finding the singular vector corresponding to the highest singular value of the modified channel matrices $H_{sb}W_1$ for each subband. Each row of $W_2$ is the corresponding sub-band singular vector.
2. Taking the inverse Fourier transform of the columns of $W_2$ results in $\tilde{W}_2$, i.e., $\tilde{W}_2 = VW_2$. If a value of oversampling O3>1 is adopted then $W_2$ is first properly zero padded. By proper we mean that the zero padding can be either in the end of $W_2$ which will results in $\tilde{W}_2$ a collection of upsampled analytical beam signals, or the zero padding is done in the high frequency or the central region which will make $\tilde{W}_2$ a collection of upsampled band limited beam signals. Both of these are referred to as upsampled beam signals in the subsequent discussions.

Feedback overhead reduction occurs when the UE feeds backs an indication of non-zero subset of the coefficients in $\tilde{W}_2$, e.g. those coefficients with the largest magnitudes and are separated by a multiple of O3, the oversampling factor between them. The feedback overhead also depends on how much quantization is used to represent these coefficients. If O3>1, then the value of rotation or fractional part (fp) is reported as an integer value between $0 \leq fp < O3$. Note that the structure defined in (1) may be allowed to have a different fractional part (fp) for each column (beam) in $\tilde{W}_2$.

Scaling each of the singular vectors in step-1 above with a unit magnitude complex scalar coefficient will neither change the singular values nor change the subspace of the singular vectors. Looking at it differently, the phase of the singular vector is generally implementation dependent and since singular vectors may be determined independently for all the sub-bands, depending upon the implementation, this phase can be random from sub-band to sub-band. It has been observed that the Fourier transform based quantization approach does not perform well when this phase is random. Thus, the phase of each column of $W_2$ can be changed as needed to provide certain structure, which helps in quantization later. Since $W_2$ is obtained from singular vectors, we refer to the elements of $W_2$ as singular vector coefficients of the modified channel.

In an approach wherein zero phase is assigned to the column of $W_2$ corresponding to the main beam, in which the main beam is identified in such a way that it results in the first tap of that beam to be the strongest tap. This enables normalization of all the taps with respect to the first tap of the main beam before quantization.

Let m be the index of the main beam. The phase of all the $N_{sb}$ terms of the m-th column of $W_2$ is now set to zero. Let $\alpha_{ij}$ be the amplitude, and $\phi_{ij}$ be the phase of ijth element of $W_2$, i.e, the ijth element of $W_2$ is given by:

$$w_{2ij} = \alpha_{ij} \exp(\sqrt{-1}\phi_{ij})$$

To zero out the phase of the main beam, we obtain the phase of all the beams by subtracting the phase of the main beam from the phase of that beam. This subtraction is performed over all sub-bands. The new phase values of $W_2$ are now given as $$\phi'_{ij} = \phi_{ij} - \phi_{im}.$$

Now the ij-th element becomes $$w_{2ij} = \alpha_{ij}\exp(\sqrt{-1}(\phi_{ij}-\phi_{im})) = \alpha_{ij}\exp(\sqrt{-1}(\phi'_{ij})),$$

and for the main beam these elements are positive (non-negative) real numbers given by $$w_{2im} = \alpha_{im}$$

Since all the $N_{sb}$ elements corresponding to the main beam of $W_2$ have zero phase and $\tilde{W}_2 = VW_2$, i.e., the ij-th taps are computed as:

$$\tilde{w}_{2ij} = \sum_{k=1}^{Nsb} \alpha_{kj}\exp\left(\sqrt{-1}\left(\phi'_{kj} + 2\pi\frac{ik}{N_{sb}}\right)\right), \quad (1b)$$

and for the main beam the tap becomes $$\tilde{w}_{2im} = \sum_{k=1}^{Nsb} \alpha_{km}\exp\left(\sqrt{-1}\, 2\pi\frac{ik}{N_{sb}}\right). \quad (1a)$$

The zero-th tap of the main beam now becomes $$\tilde{w}_{20m} = \Sigma_{k=1}^{Nsb} \alpha_{km}.$$

Now if we selected the main beam index m such that $$m = \underset{j}{\operatorname{argmax}}\left(\sum_{i=1}^{Nsb} \alpha_{ij}\right), \quad (2)$$

then it can be shown that the first-tap which is equal to $\Sigma_{i=1}^{Nsb}\alpha_{im}$ is the largest over all possible taps over all the beams. Note that even for the main beam all other taps of the main beam are also smaller than the first tap.

Often the taps may be computed using an oversampling. Taps at an oversampling location i' (i' not an integer) are obtained using an equation similar to 1b, i.e., $$\tilde{w}_{2i'j} = \sum_{k=1}^{Nsb} \alpha_{kj}\exp\left(\sqrt{-1}\left(\phi'_{kj} + 2\pi\frac{i'k}{N_{sb}}\right)\right).$$

Dividing numerator and denominator of the factor $$\frac{i'k}{N_{sb}}$$

by the oversampling factor O3 in the above equation results in:

$$\tilde{w}_{2i'j} = \sum_{k=1}^{Nsb} \alpha_{kj}\exp\left(\sqrt{-1}\left(\phi'_{kj} + 2\pi\frac{i'O_3 k}{O_3 N_{sb}}\right)\right).$$

Let p be the integer part and f be the fractional part of i', respectively. Limiting f such that q=f·O3 is an integer results in the above equation becoming:

$$\tilde{w}_{2i'j} = \sum_{k=1}^{Nsb} \alpha_{kj}\exp\left(\sqrt{-1}\left(\phi'_{kj} + 2\pi\frac{pO_3+q}{O_3 N_{sb}}\right)\right),$$

where $0 \le p < N_{sb}$ and $0 \le q < O3$.

It can also be shown that choosing the main beam using (2) also ensures that the oversampling of the taps (over all the beams) will also not result in any tap larger than the first tap of the main beam.

After performing the inverse transformation to get $\tilde{W}_2 = VW_2$, it may be better to normalize all taps with respect to a largest possible value. This can help in enabling the range of the quantizer used for quantizing the taps.

Since we know that zeroing out the phase of the main beam and selecting main beam using equation (2) helps to ensure that first-tap of the main beam is the strongest tap, and if we now perform this normalization using the first-tap of the main beam, i.e., $$\tilde{w}_{2ij} = \frac{\tilde{w}_{2ij}}{\tilde{w}_{20m}}.$$

then the first tap of the main beam would be $$1\left(\frac{\tilde{w}_{20m}}{\tilde{w}_{20m}} = 1\right).$$

Thus, there may now be no need to explicitly quantize the first tap of the main beam. The value of this tap can be directly inferred to be 1. The strongest (in some sense) taps of each beam are reported in Release 16 Type II CSI and generally consist of an amplitude and a phase. Because the first tap, which will typically always be included due to its maximum amplitude condition, can be inferred to be 1, it may need not be reported, thereby saving uplink control signaling overhead.

Furthermore, going back to equation (1a), it can be seen that the i-th tap of the main beam is a complex conjugate of the $N_{sb}$–i tap, i.e., $\tilde{w}_{2im} = \tilde{w}^*_{2(Nsb-i)m}$, where * is a complex conjugate operation. This enables us to quantize and transmit only one half of the main beam taps, the second half of the taps can be obtained at the receiver (gNB) using this symmetric property. Similarly, if only a subset of taps are reported on either a common or independent basis (same or different set of taps across beams respectively), the number of possibilities for the combinations of taps can be reduced because then approximately half of the taps are pairs which means the number of possibilities is approximately cut in half. This can also reduce the uplink signaling overhead.

If an upsampling factor is to be reported for all the beams by choosing a fractional part which results in maximum tap value for that beam, then for the main beam the fractional component will generally always be zero so again there may be no need to report the fractional part for the main beam.

To summarize, normalization with the first tap of the main beam besides generating good range for quantization of other taps, gives us the following potential features:
 a. Do not need to spend any bits to code the first tap of the main beam. It will be one.
 b. Do not need to specify one of the strongest tap, it will be the first tap of the main beam.
 c. Also the oversampling factor for the main beam will be 0.
 d. Since we are using zero phase for the main beam, so the coefficients before inverse Fourier transform are real and hence the column of $\tilde{W}_2$ corresponding to the main beam will be symmetric and the quantization method can advantageously use this property.

In accordance with at least some embodiments, the oversampling of a time domain signal (transformed from frequency domain) may help in localization of the energy to a small number of taps and thereby may help in reducing the number of bits needed to quantize a signal. The oversampling factor for the upsampled main beam signal is 0, i.e., the peak of the oversampled main beam signal is at a location 0 and/or a multiple of O3, so there may be no need to send any extra bits to convey that information.

However, the other beams may not conform to this, i.e., the peak of the other beams may not be at the multiple of O3 (a beam whose peak is not at a multiple of the oversampling factor is referred to as a beam having a fractional part). Independently transmitting the fractional part of the other beams may significantly increase the overhead and since many of the beams may have very small contribution to the precoding vector, it may not be advisable to transmit the fractional part of those upsampled beams signals.

The fractional part identifies the peak position of sum of absolute values of all the beams which is likely at the $0^{th}$ location (peak of the main beam). Hence it may not provide performance gain. Recently, it has also been shown that there may be little to no advantage of including a common oversampling factor and the same performance may be achieved by providing proper phase compensation.

To cater to these two situations, i.e., there may be little to no advantage of having a single common fractional part for all beams versus having a different upsampling factor for all the remaining beams. Correspondingly, we propose a) to have an O3=1 for the beams corresponding to the polarization of the main beams since the beam with most energy in that polarization has a fractional part of 0.

b) Set O3 to a value greater than 1 (e.g., O3=4) for the beams of the other polarization (different polarization than the polarization of the main beam), and transmit the fractional part (fp) of the upsampling factor.

Equation (1) given in the section above caters to the case where all the upsampled beam signals can possibly have a fractional part. Hence, if we use that method even for the proposed approach where we have only one set of beams with oversampling and the other set of beams does not have oversampling, then we may be increasing the complexity. Instead, we could adopt the following approach:

If the main beam or the beam of the strongest polarization is pol0 then the precoding vector is obtained as $$W = \begin{bmatrix} B & 0 \\ 0 & B \end{bmatrix} \begin{bmatrix} \tilde{W}_{2,pol0} & 0 \\ 0 & \tilde{W}_{2,pol1} \end{bmatrix} \begin{bmatrix} V(N_{sb}, 1, 0) \\ V(N_{sb}, O_3, q_3) \end{bmatrix}$$

or if pol1 is the strongest polarization $$W = \begin{bmatrix} B & 0 \\ 0 & B \end{bmatrix} \begin{bmatrix} \tilde{W}_{2,pol0} & 0 \\ 0 & \tilde{W}_{2,pol1} \end{bmatrix} \begin{bmatrix} V(N_{sb}, O_3, q_3) \\ V(N_{sb}, 1, 0) \end{bmatrix}$$

where V(N, O, q) is the N×N matrix obtaining by taking columns q, q+O, . . . , q+(N-1)O of an oversampled DFT matrix with oversampling factor O.

The oversampling may help more for high energy signals. Now one of the high energy signals, which has already been captured as the main beam has been purposefully made to have an oversampling factor of zero. The other high-energy beam typically is the corresponding beam in the other polarization.

Limiting beams of other polarization may make the wide band (WB) gain of the other polarization higher. This could also help in improving performance.

FIG. 2 is a table 200 showing an exemplary gain from using O3=4 over another polarization. The table shows that using O3=4 can result in a consistent user packet throughput (UPT) improvement.

Besides using O3=4 and a common fractional part for the other polarization, we can use O3=4 and a common fractional part over the remaining beams (other than the main beam) or a subset of beams. The subset of beams can be selected from the beams with larger tap values. The subset can be a set of beams of the other polarization with larger taps values. Basically choosing a subset based on the ordering of the quantized tap values of the beams.

Figure 3:
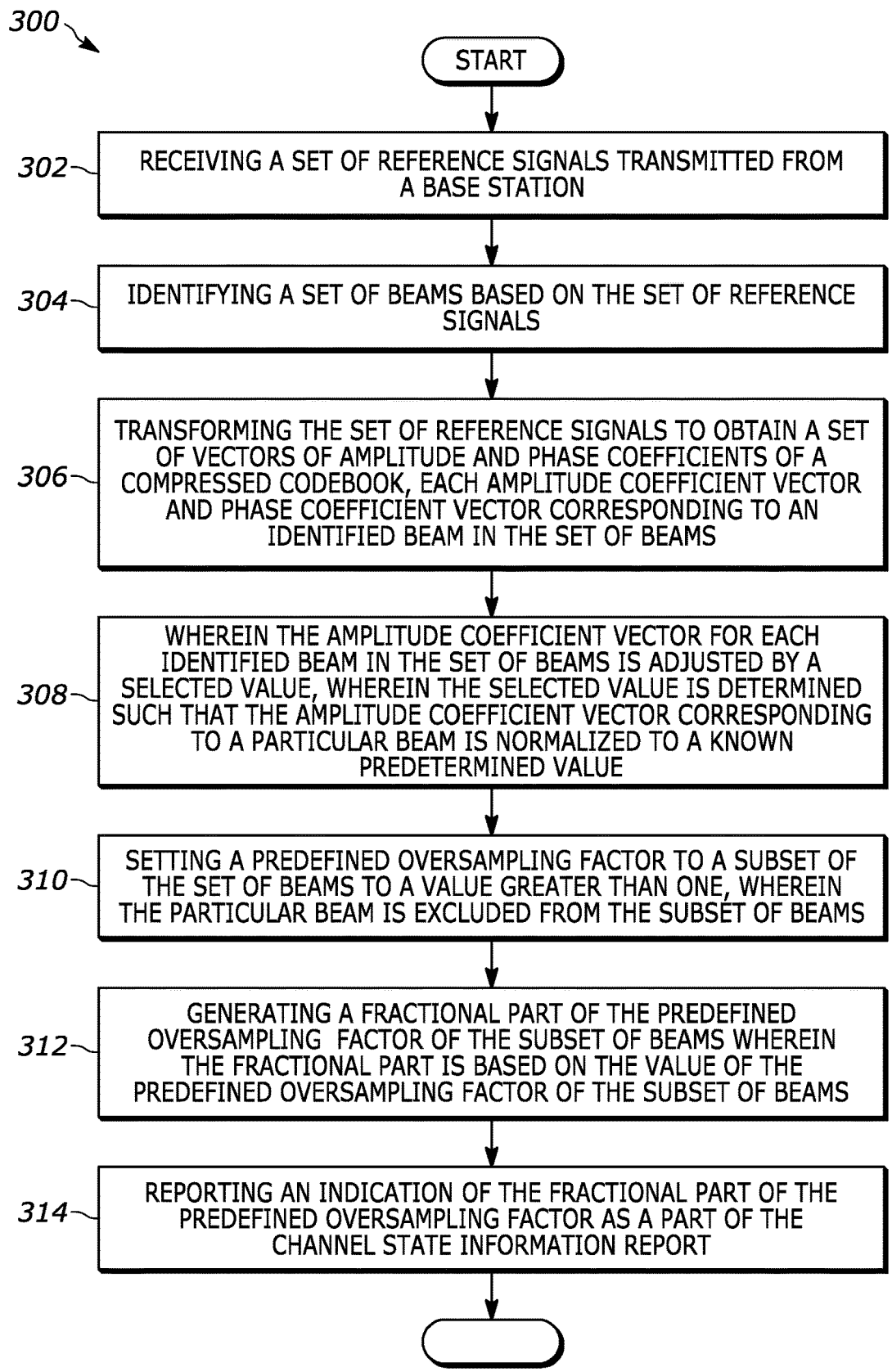
FIG. 3 is a flow diagram in a user equipment for generating a channel state information report having a predefined oversampling factor associated with a subset of the set of beams.

FIG. 3 illustrates a flow diagram 300 in a user equipment for generating a channel state information report having a predefined oversampling factor associated with a subset of the set of beams. The method includes receiving 302 a set of reference signals transmitted from a base station, and identifying 304 a set of beams based on the set of reference signals. The set of reference signals is transformed 306 to obtain a set of vectors of amplitude and phase coefficients of a compressed codebook, each amplitude coefficient vector and phase coefficient vector corresponding to an identified beam in the set of beams. The amplitude coefficient vector for each identified beam in the set of beams is adjusted 308 by a selected value, wherein the selected value is determined such that the amplitude coefficient vector corresponding to a particular beam is normalized to a known predetermined value. A predefined oversampling factor is set 310 to a subset of the set of beams to a value greater than one, wherein the particular beam is excluded from the subset of beams. A fractional part of the predefined oversampling factor of the subset of beams is generated 312, wherein the fractional part is based on the value of the predefined oversampling factor of the subset of beams. An indication of the fractional part of the predefined oversampling factor is reported 314 as a part of the channel state information report.

In some instances, generating the fractional part of the subset of beams can be based on the set of vectors of amplitude and phase coefficients of the compressed codebook corresponding to the subset of beams.

In some instances, the subset of beams can contain all the beams other than the particular beam. In some instances, the subset of beams can contains a single beam.

In some instances, the beams can be further partitioned into at least two disjoint groups and wherein the beams belonging to the subset of beams do not belong to a group containing the particular beam. In some of these instances, a set of polarizations can be in the groups.

In some instances, the subset of beams can be based on the set of vectors of amplitude of the compressed codebook corresponding to the set of beams. In some of these instances, the set of vectors of amplitude can be further modified based on the fractional part.

In some instances, the compressed codebook can be a Discrete Fourier Transform compressed codebook.

In some instances, the phase coefficient vector for each identified beam in the set of beams can be adjusted by a selected value, wherein the selected value is determined such that the phase coefficient vector corresponding to the particular beam has no phase offset.

Figure 4:
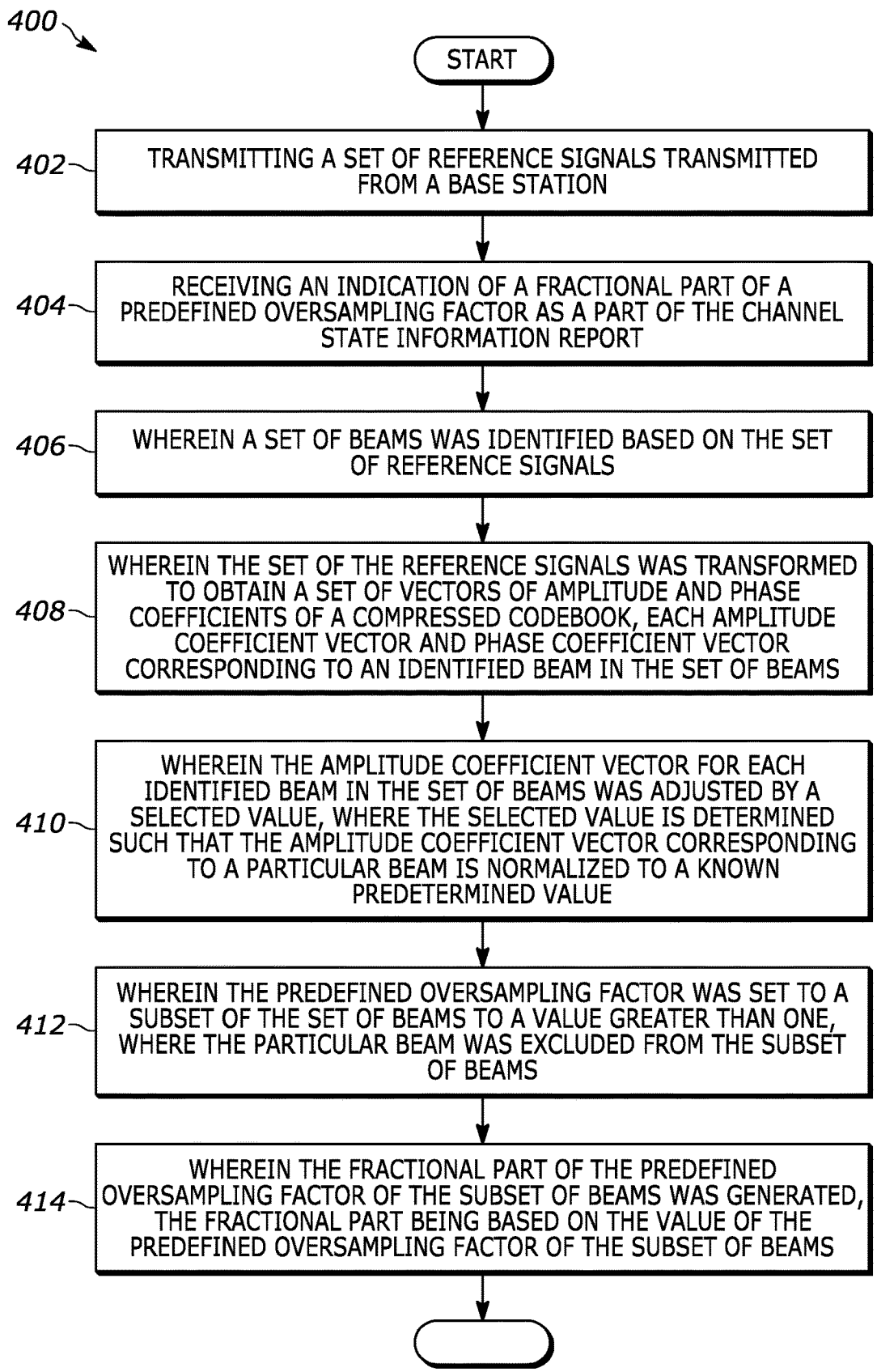
FIG. 4 is a flow diagram in a network for generating a channel state information report having a predefined oversampling factor associated with a subset of the set of beams.

FIG. 4 illustrates a flow diagram 400 in a network for generating a channel state information report having a predefined oversampling factor associated with a subset of the set of beams. The method includes transmitting 402 a set of reference signals transmitted from a base station, and receiving 404 an indication of a fractional part of a predefined oversampling factor as a part of the channel state information report. A set of beams are identified 406 based on the set of reference signals. The set of reference signals are transformed 408 to obtain a set of vectors of amplitude and phase coefficients of a compressed codebook, each amplitude coefficient vector and phase coefficient vector corresponding to an identified beam in the set of beams. The amplitude coefficient vector for each identified beam in the set of beams is adjusted 410 by a selected value, where the selected value is determined such that the amplitude coefficient vector corresponding to a particular beam is normalized to a known predetermined value. The predefined oversampling factor is set 412 to a subset of the set of beams to a value greater than one, where the particular beam was excluded from the subset of beams. The fractional part of the predefined oversampling factor of the subset of beams is generated 414 with the fractional part being based on the value of the predefined oversampling factor of the subset of beams.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 5:
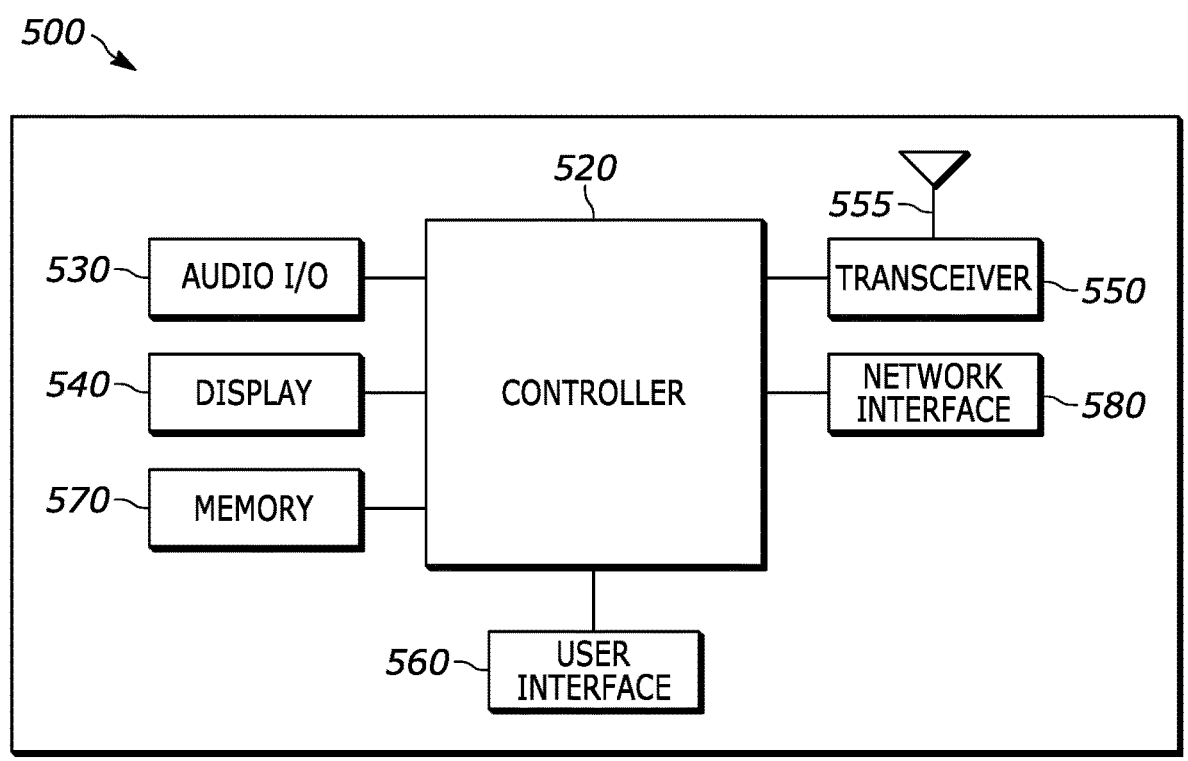
FIG. 5 is an example block diagram of an apparatus according to a possible embodiment.

FIG. 5 is an example block diagram of an apparatus 500, such as the wireless communication device 110, according to a possible embodiment. The apparatus 500 can include a housing 510, a controller 520 within the housing 510, audio input and output circuitry 530 coupled to the controller 520, a display 540 coupled to the controller 520, a transceiver 550 coupled to the controller 520, an antenna 555 coupled to the transceiver 550, a user interface 560 coupled to the controller 520, a memory 570 coupled to the controller 520, and a network interface 580 coupled to the controller 520. The apparatus 500 can perform the methods described in all the embodiments The display 540 can be a viewfinder, a liquid crystal display (LCD), a light emitting diode (LED) display, a plasma display, a projection display, a touch screen, or any other device that displays information. The transceiver 550 can include a transmitter and/or a receiver. The audio input and output circuitry 530 can include a microphone, a speaker, a transducer, or any other audio input and output circuitry. The user interface 560 can include a keypad, a keyboard, buttons, a touch pad, a joystick, a touch screen display, another additional display, or any other device useful for providing an interface between a user and an electronic device. The network interface 580 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 570 can include a random access memory, a read only memory, an optical memory, a solid state memory, a flash memory, a removable memory, a hard drive, a cache, or any other memory that can be coupled to an apparatus.

The apparatus 500 or the controller 520 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 570 or elsewhere on the apparatus 500. The apparatus 500 or the controller 520 may also use hardware to implement disclosed operations. For example, the controller 520 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 520 may be any controller or processor device or devices capable of operating an apparatus and implementing the disclosed embodiments. Some or all of the additional elements of the apparatus 500 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method in a user equipment for generating a channel state information report, the method comprising:
receiving a set of reference signals transmitted from a base station;
identifying a set of beams based on the set of reference signals;

transforming the set of reference signals to obtain a set of vectors of amplitude and phase coefficients of a compressed codebook, each amplitude coefficient vector and phase coefficient vector corresponding to an identified beam in the set of beams;

wherein the amplitude coefficient vector for each identified beam in the set of beams is adjusted by a selected value, wherein the selected value is determined such that the amplitude coefficient vector corresponding to a particular beam is normalized to a known predetermined value;

setting a predefined oversampling factor to a subset of the set of beams to a value greater than one, wherein the particular beam is excluded from the subset of beams;

generating a fractional part of the predefined oversampling factor of the subset of beams wherein the fractional part is based on the value of the predefined oversampling factor of the subset of beams; and reporting an indication of the fractional part of the predefined oversampling factor as a part of the channel state information report.

2. The method of claim 1 wherein generating the fractional part of the subset of beams is based on the set of vectors of amplitude and phase coefficients of the compressed codebook corresponding to the subset of beams.

3. The method of claim 1 wherein the subset of beams contains all the beams other than the particular beam.

4. The method of claim 1 wherein the subset of beams contains a single beam.

5. The method of claim 1 wherein the beams are further partitioned into at least two disjoint groups and wherein the beams belonging to the subset of beams do not belong to a group containing the particular beam.

6. The method of claim 5 where in the groups are a set of polarizations.

7. The method of claim 1 wherein the subset of beams is based on the set of vectors of amplitude of the compressed codebook corresponding to the set of beams.

8. The method of claim 7, wherein the set of vectors of amplitude is further modified based on the fractional part.

9. The method of claim 1, wherein the compressed codebook is a Discrete Fourier Transform compressed codebook.

10. The method of claim 1, wherein the phase coefficient vector for each identified beam in the set of beams is adjusted by a selected value, wherein the selected value is determined such that the phase coefficient vector corresponding to the particular beam has no phase offset.

11. A user equipment for generating a channel state information report, the user equipment comprising:

a transceiver that receives a set of reference signals transmitted from a base station; and a controller that identifies a set of beams based on the set of reference signals;

wherein the controller transforms the set of reference signals to obtain a set of vectors of amplitude and phase coefficients of a compressed codebook, each amplitude coefficient vector and phase coefficient vector corresponding to an identified beam in the set of beams;

wherein the amplitude coefficient vector for each identified beam in the set of beams is adjusted by the controller by a selected value, wherein the selected value is determined such that the amplitude coefficient vector corresponding to a particular beam is normalized to a known predetermined value;

wherein the controller sets a predefined oversampling factor to a subset of the set of beams to a value greater than one, wherein the particular beam is excluded from the subset of beams;

wherein the controller generates a fractional part of the predefined oversampling factor of the subset of beams wherein the fractional part is based on the value of the predefined oversampling factor of the subset of beams; and wherein the transceiver reports an indication of the fractional part of the predefined oversampling factor as a part of the channel state information report.

12. The user equipment of claim 11 wherein generating the fractional part of the subset of beams is based on the set of vectors of amplitude and phase coefficients of the compressed codebook corresponding to the subset of beams.

13. The user equipment of claim 11 wherein the subset of beams contains all the beams other than the particular beam.

14. The user equipment of claim 11 wherein the subset of beams contains a single beam.

15. The user equipment of claim 11 wherein the beams are further partitioned into at least two disjoint groups and wherein the beams belonging to the subset of beams do not belong to a group containing the particular beam.

16. The user equipment of claim 15 where in the groups are a set of polarizations.

17. The user equipment of claim 11 wherein the subset of beams is based on the set of vectors of amplitude of the compressed codebook corresponding to the set of beams.

18. The user equipment of claim 17, wherein the set of vectors of amplitude is further modified based on the fractional part.

19. The user equipment of claim 11, wherein the compressed codebook is a Discrete Fourier Transform compressed codebook.

20. The user equipment of claim 11, wherein the phase coefficient vector for each identified beam in the set of beams is adjusted by a selected value, wherein the selected value is determined such that the phase coefficient vector corresponding to the particular beam has no phase offset.

* * * * *